(12) United States Patent
Sibilant et al.

(10) Patent No.: US 8,657,490 B2
(45) Date of Patent: Feb. 25, 2014

(54) METHOD FOR MEASURING ELECTRICAL CONDUCTOR TEMPERATURE

(71) Applicant: Electric Power Research Institute, Inc., Palo Alto, CA (US)

(72) Inventors: Gary Charles Sibilant, Charlotte, NC (US); Andrew John Phillips, Harrisburg, NC (US); Daniel Clinton Lawry, Alplaus, NY (US)

(73) Assignee: Electric Power Research Institute, Inc., Palo Alto, CA (US)

( * ) Notice: Subject to any disclaimer, the term of this patent is extended or adjusted under 35 U.S.C. 154(b) by 0 days.

(21) Appl. No.: 13/761,311

(22) Filed: Feb. 7, 2013

(65) Prior Publication Data

US 2013/0208760 A1 Aug. 15, 2013

Related U.S. Application Data

(60) Provisional application No. 61/596,978, filed on Feb. 9, 2012.

(51) Int. Cl.
*G01K 5/00* (2006.01)
*G01K 1/00* (2006.01)

(52) U.S. Cl.
USPC ............ 374/141; 374/121; 374/161; 374/208

(58) Field of Classification Search
USPC ......... 374/121, 124, 161, 162, 141, 208, 186, 374/187; 403/179, FOR. 100; 24/455, 456
See application file for complete search history.

(56) References Cited

U.S. PATENT DOCUMENTS

| 4,584,523 | A | * | 4/1986 | Elabd ............................. 324/96 |
| 4,796,027 | A | * | 1/1989 | Smith-Vaniz ............ 340/870.03 |
| 4,904,996 | A | | 2/1990 | Fernandes |
| 5,864,144 | A | | 1/1999 | Laine |
| 6,369,328 | B1 | | 4/2002 | Munakata |
| 6,469,511 | B1 | * | 10/2002 | Vonderhaar et al. .......... 324/425 |
| 6,648,506 | B2 | | 11/2003 | McGrath et al. |
| 6,726,761 | B2 | | 4/2004 | Hodgkinson et al. |
| 6,776,522 | B2 | | 8/2004 | Syracuse et al. |

(Continued)

FOREIGN PATENT DOCUMENTS

| TW | 200946883 A | * | 11/2009 |
| WO | WO 83/02841 A1 | | 8/1983 |
| WO | WO 96/12165 | | 4/1996 |

OTHER PUBLICATIONS

PCT/US2013/025037—International Search Report, mailed May 7, 2013.

(Continued)

*Primary Examiner* — Gail Verbitsky
(74) *Attorney, Agent, or Firm* — Curatolo Sidoti Co., LPA; Joseph G. Curatolo; Salvatore A. Sidoti

(57) ABSTRACT

A method for measuring the temperature of an electrical conductor, the method comprising (a) providing a clamp comprising a flexible, thermally conductive material in thermal contact with the electrical conductor, wherein the clamp has an outer surface of a known emissivity value, or a coating of a known emissivity value is disposed on the outer surface of the clamp and (b) measuring the infrared (IR) temperature of the clamp to determine the temperature of the electrical conductor.

18 Claims, 3 Drawing Sheets

(56) References Cited

U.S. PATENT DOCUMENTS

| | | |
|---|---|---|
| 7,003,425 B2 | 2/2006 | Bird et al. |
| 7,005,992 B2 * | 2/2006 | Kawai et al. ............ 340/588 |
| 7,080,939 B1 * | 7/2006 | Fair et al. .............. 374/102 |
| 7,332,718 B2 * | 2/2008 | Okamura et al. ......... 250/341.1 |
| 7,845,848 B2 | 12/2010 | Yakymyshyn et al. |
| 7,902,854 B2 | 3/2011 | Gunn et al. |
| 2004/0071185 A1 | 4/2004 | Syracuse et al. |
| 2006/0265175 A1 | 11/2006 | Shimohamadi |
| 2006/0274814 A1 * | 12/2006 | Wang ..................... 374/208 |
| 2007/0296541 A1 * | 12/2007 | Garcia et al. ............ 338/22 R |
| 2008/0261687 A1 * | 10/2008 | Gatzios ................... 463/29 |
| 2009/0015239 A1 | 1/2009 | Georgiou et al. |
| 2010/0008397 A1 * | 1/2010 | Johnson, Jr. ............. 374/152 |
| 2011/0181393 A1 * | 7/2011 | Tillotson et al. .......... 340/10.1 |
| 2012/0019622 A1 | 1/2012 | Rousselle et al. |
| 2012/0031517 A1 * | 2/2012 | Yoshida et al. ........... 138/103 |
| 2012/0197558 A1 * | 8/2012 | Henig et al. ............. 702/58 |

OTHER PUBLICATIONS

PCT/US2013/025037—International Written Opinion, mailed May 7, 2013.

* cited by examiner

METHOD FOR MEASURING ELECTRICAL CONDUCTOR TEMPERATURE

This application claims the benefit of the filing date under 35 U.S.C. §119(e) of U.S. Provisional Application for Patent Ser. No. 61/596,978, filed Feb. 9, 2012, which is incorporated herein by reference.

The demand for electric power is escalating considerably more quickly than new transmission facilities can be constructed. This trend has pushed the capacity of many existing transmission circuits to their design limits. In order to provide electric power to a society that is continuously increasing its power consumption, without having to sustain large capital expenditures for new infrastructure, the power industry is pushing more power through existing lines.

Construction of new transmission networks is not keeping pace with the increased demand, therefore, existing assets must carry more power. As more current is transmitted through a conductor, its temperature increases due to resistive losses. As a result, overhead transmission conductors are being operated at higher temperatures. Operating conductors at higher temperatures results in higher thermal losses and more mechanical movement and stress, however, the industry has found it to be a cost-effective approach when compared to alternatives.

Conductor temperature must be limited in order to avoid excessive sag, which might infringe on minimum electrical clearances, to limit annealing of aluminum and copper strands which might lead to future tensile failure during heavy ice and/or wind loads, and to avoid damage to conductor hardware and connectors from thermal fatigue.

During high-load conditions, and under emergency circumstances (such as when a failure occurs in a segment of the grid and power must be shifted to other sections to compensate), it often becomes necessary to load conductors up to the limits permitted by the relevant regulations. In these operational situations, it must be ensured that maximum temperature limits are not exceeded. Conductor temperature measurements provide critical operational data to engineers, especially in the case of a system contingency, that may result in conductor failure if not corrected.

Because operating at elevated temperatures has an impact on the mechanical, thermal, and electrical performance of overhead lines, it is necessary that the industry have efficient and accurate methods of measuring the temperature of electric transmission and distribution conductors.

Figure 1A:
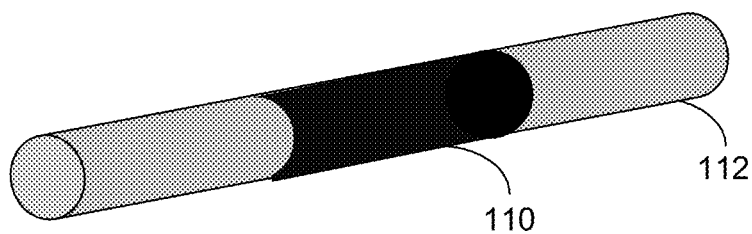
FIG. 1A is a perspective side view of an illustrative embodiment of an article useful in a method for measuring electrical conductor temperature.

Provided is a method for ensuring reliable, repeatable, non-contact temperature measurement of an electrical conductor. The electrical conductor may be a bare (non-insulated) overhead line conductor. In an embodiment, the electrical conductor may be an overhead transmission or distribution line.

In an embodiment, a method for measuring the temperature of an electrical conductor comprises (a) providing a clamp comprising a flexible, thermally conductive material in thermal contact with the electrical conductor, wherein the clamp has an outer surface of a known emissivity value, or a coating of a known emissivity value is disposed on the outer surface of the clamp; and (b) measuring the infrared (IR) temperature of the clamp to determine the temperature of the electrical conductor.

In accordance with other embodiments, a method for measuring the temperature of an electrical conductor comprises mechanically coupling a clamp to the electrical conductor, the clamp comprises a flexible, thermally conductive material; the clamp having an outer surface of a known emissivity value, or a coating of a known emissivity value disposed on the outer surface of the clamp, and the temperature of the electrical conductor is capable of being determined by measuring the IR temperature of the clamp outer surface or coating.

Emissivity is defined as the ratio of the energy radiated by an object at a given temperature to the energy emitted by a perfect radiator, or blackbody, at the same temperature. The amount of thermal energy an object will radiate is not only a function of temperature, but depends on the material itself.

Different types of materials possess different emissivities, and will therefore emit infrared (IR) energy at different intensities for a given temperature. The emissivity of a material is a function of its molecular structure and surface characteristics.

Values of emissivity fall between 0.0 and 1.0. A black body is considered to possess maximum emissivity. The emissivity of an ideal blackbody is considered 1.0, or maximum emissivity. Bodies with emissivity less than 1.0 are known as gray bodies. Surfaces that are polished and/or reflective are known as low emissivity surfaces. An accurate IR reading may be difficult to obtain from a low emissivity surface. In general, the higher the emissivity of an object, the easier it is to obtain an accurate temperature measurement.

An IR thermometer, or IR thermography camera, may be used to measure, detect, and/or provide an image of thermal energy emitted from an object. The higher an object's temperature, the greater the IR radiation emitted. IR thermography cameras produce images of invisible infrared or heat radiation and may provide precise non-contact temperature measurement capabilities. An IR thermometer measures temperature by receiving infrared energy from a target and focusing that energy onto a detector which produces an electric output directly related to the received radiant energy. The thermometer receives the IR energy, but cannot calculate the target's temperature without having an input value for the target's emissivity.

Accurate IR temperature measurements of overhead transmission and distribution lines is difficult to achieve because the emissivity of the conductors is not easily determined. The emissivity of a conductor may be estimated. However, estimating conductor emissivity may be problematic since many conductors are stranded and thus do not have uniform surfaces. Applying paint, of a known emissivity, to the conductors may help to improve the accuracy of the IR temperature measurement, however, this approach presents many challenges and shortcomings. Application of the paint is labor intensive and time consuming, given that the paint may be manually brushed or sprayed onto the conductors. It may be difficult to achieve a consistent, uniform coating of paint on live overhead lines. The paint has a limited life, as it eventually wears off of the conductor. Furthermore, the emissivity of the paint changes over time as it wears, affecting the accuracy of IR temperature measurements. The present method overcomes these challenges and provides an accurate, efficient and economical approach for measuring conductor temperature.

In an embodiment, a method for measuring the temperature of an electrical conductor includes providing a clamp comprised of a flexible, thermally conductive material in thermal contact with the electrical conductor. The electrical conductor may be, for example, a high voltage transmission and/or distribution line.

In an embodiment, the clamp may include an outer surface of a known emissivity value, or a coating of a known emissivity value disposed on the outer surface of the clamp. In certain embodiments, it is preferable that the clamp's outer coating exhibit an emissivity value as close to 1.0 as possible. The clamp may be mechanically coupled to, and in thermal contact with, an electrical conductor. The IR temperature of the clamp may be measured to determine the temperature of the electrical conductor. The known emissivity value of clamp's outer surface ensures reliable, repeatable, non-contact temperature measurements of the electrical conductor. In an embodiment, the present method facilitates temperature measurement from a distance without contact with the conductor to be measured. IR temperature measurements of overhead transmission and distribution lines are especially helpful because of the difficulty and dangerousness of physically accessing the high voltage lines.

In accordance with an embodiment, the IR temperature of the clamp may be measured by using, for example, an infrared measurement device, to determine the temperature of an electrical conductor. The clamp may be mechanically coupled to an electrical conductor, such as by crimping or the like, such that the clamp is in thermal contact the conductor. In other words, heat from the electrical conductor may be transferred to the clamp so that the temperature of the outer surface of the clamp is indicative of the temperature of the conductor. The IR measurement device may be provided with the known emissivity value of the clamp's outer surface. The measurement device may calculate and display the temperature of the clamp based on the infrared energy received from the clamp and the emissivity value of the clamp's outer surface.

In certain illustrative embodiments, a coating of a known emissivity value is disposed on the outer surface of the clamp. The temperature of the electrical conductor is capable of being determined by measuring the IR temperature of the clamp. A high emissivity coating may be applied to the outer surface of the clamp utilizing a variety of methods, for example, spraying, electrostatic painting, powder coating and/or anodizing. The high emissivity coating may contain materials capable of absorbing and re-radiating thermal energy, such as, for example but without limitation, compounds containing zirconium, chromium, and/or cerium.

As illustrative examples, high emissivity paint was sprayed onto an electrical conductor and IR measurements were then made. The color used was either off-white (almond) or black. However, the color of the paint is not important as long as the emissivity of the paint (coating) is known and in some embodiments is close to 1.

In accordance with an embodiment, the clamp may be comprised of a thin, flexible, thermally conductive material, for example and without limitation, silver, aluminum, copper, gold, platinum, tantalum, molybdenum, zinc, tin, nickel, and/or mixtures or alloys thereof. In an embodiment, the clamp material may be less than five (5) mm thick. In some embodiments, the flexible, thermally conductive clamp material may be between 0.1 mm and 5 mm thick.

In some embodiments, the clamp may comprise a unitary body. In other embodiments, the clamp may comprise multiple sections and/or segments. The clamp may be of sufficient length to enable an accurate IR measurement of the clamp's outer surface from a distance. In an exemplary embodiment, the clamp is about two (2) feet in length. In other embodiments, the clamp may be between six (6) inches and ten (10) feet in length.

Figure 1B:
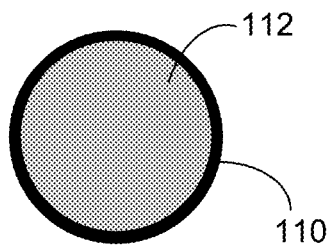
FIG. 1B is a cross-sectional view of an illustrative embodiment of the article.
Figure 1C:
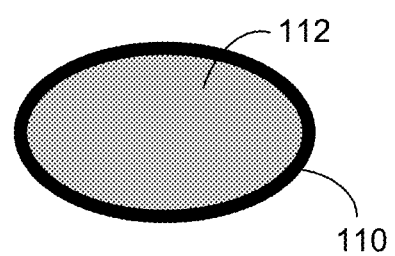
FIG. 1C is a cross-sectional view of an illustrative embodiment of the article.
Figure 1D:
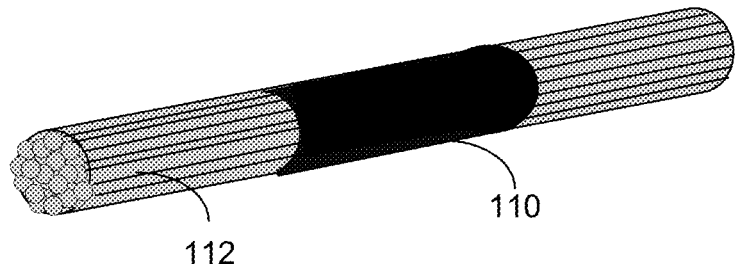
FIG. 1D is a perspective side view of an illustrative embodiment of the article.

As shown in FIG. 1A, the clamp 110 may be mechanically coupled to an electrical conductor 112, such that the clamp is in thermal contact the conductor. In other words, heat from the electrical conductor may be transferred to the clamp so that the temperature of the outer surface of the clamp is indicative of the temperature of the conductor. The clamp 110 may comprise a generally cylindrically shaped, hollow body whose cross-section may approximate a hollow circle, as illustrated in FIG. 1B, or hollow oval, as shown in FIG. 1C. Referring to FIG. 1B, when installed on an electrical conductor 112, the clamp 110 may substantially completely surround the electrical conductor 112. The clamp 110 may be capable of conforming to electrical conductors of varying diameters, and conductors with uneven surfaces, such as stranded conductors, as shown in FIG. 1D.

The clamp 110 may be capable of remaining securely in place on the electrical conductor 112 under varying environmental and/or physical stress including, for example, wind, rain, snow, ice, vibration, and/or temperature cycling due to line current.

In accordance with certain embodiments, the outer surface coating of the clamp may possess hydrophobic properties. The outer surface of the clamp may include a hydrophobic coating, film, layer or portions of such coatings, films and layers. A hydrophobic material repels liquids by causing the liquid to bead-up on the material's surface and not spread out or wet the material's surface. In an embodiment, a hydrophobic surface may prevent or reduce the accumulation of snow and/or ice on the outer surface of the clamp that might otherwise interfere with obtaining an IR measurement from the clamp.

The clamp's hydrophobic outer surface may optionally be self-cleaning due to movement of beads of liquid (e.g., water) over the surface. Water droplets may be easily shed from the clamp's hydrophobic surface due to minimized adhesion forces between the clamp's outer surface and the water. The beads of water may pick up deposited dirt, debris, etc. that would otherwise mar or accumulate on the surface of the clamp and impede IR measurements of the clamp.

In further embodiments, the inner surface of the clamp may include a thermally conductive adhesive coating. Illustrative thermally conductive adhesive coatings may include, for example but not limitation, an epoxy, silicone and/or elastomeric material. The thermally conductive adhesive coating may comprise a structural or pressure sensitive adhesive. In certain embodiments, the thermally conductive adhesive coating may be applied to the clamp's inner surface at any time, for example, prior to or during the installation of the clamp on a conductor. The thermally conductive adhesive coating, disposed on the clamp's inner surface, may aid in securing the clamp to the conductor.

A hot stick is an insulated pole, usually made of fiberglass, used by electric utility workers when working on energized high-voltage electric power lines, to protect the workers from electric shock. Because the fiberglass provides electrical insulation, the hot stick allows utility workers to perform operations on power lines safely without de-energizing the power lines or while the state of the power line is not yet known. This is essential because certain operations, such as opening or closing combination fuses and switches, must occasionally be performed on an energized line. Hot sticks are made in different lengths, from a few feet long up to telescoping types of 30 feet or more. A variety of tools are generally available for attachment to the end of the hot stick. The hot stick may be used to test for voltage, tighten nuts and bolts, open and close switches, replace fuses, and perform various other tasks while not exposing the crew to a large risk of electric shock.

In certain illustrative embodiments, the clamp may be installed utilizing a hot stick and a clamp head capable of conforming the clamp around, and in thermal contact with, an electrical conductor.

Figure 2:
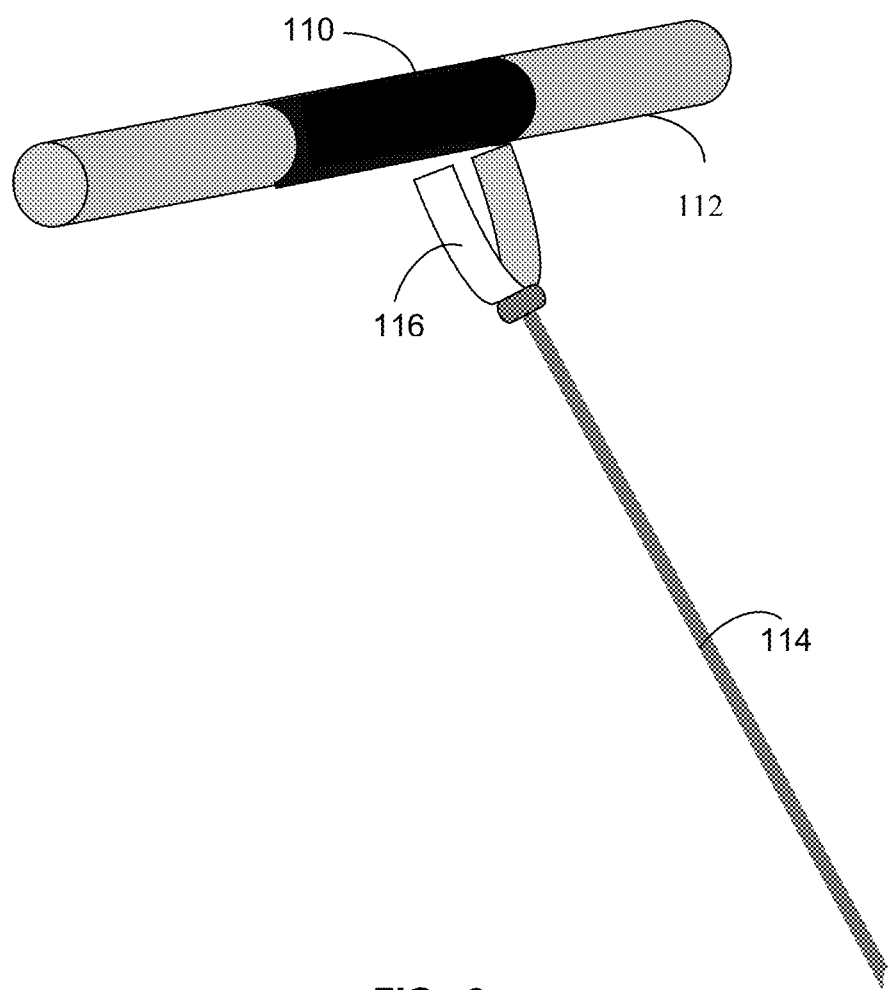
FIG. 2 is a perspective view of an illustration of an embodiment of the method for measuring electrical conductor temperature.

As shown in FIG. 2, the clamp 110 may be installed utilizing a hot stick 114 and a clamp head 116 attachment for the hot stick. In an embodiment, the clamp head 116 is capable of forming the clamp to the conductor 112. The clamp head may be comprised of, for example but not limitation, a soft rubber or other protective material capable of forming the clamp around the conductor without damaging or marring the surface of the clamp. The clamp may be placed generally surrounding the conductor and may be held in place by forces exerted by the clamp head during installation. In certain embodiments, the outer surface of the clamp may retain its shape and texture after installation while the inner surface of the clamp may conform to the electrical conductor's surface.

Figure 3:
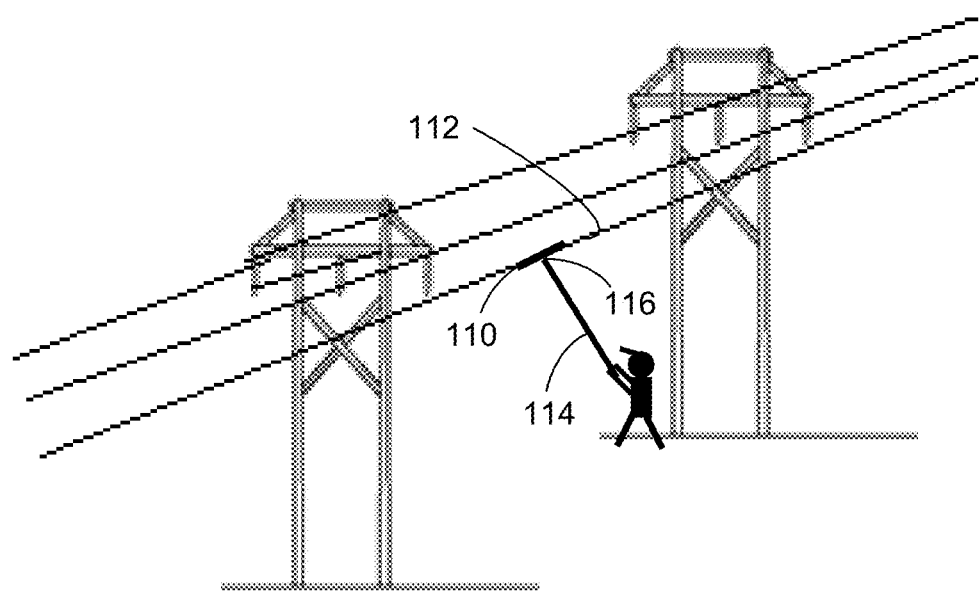
FIG. 3 is a perspective view of an illustration of an embodiment of the method for measuring electrical conductor temperature.

Referring to FIG. 3, the clamp 110 may be installed efficiently and safely utilizing a hot stick 114 and clamp head 116 attachment. The hot stick may provide maximum convenience for the installer because the hot stick enables installation of the clamp from ground level. Alternatively, the installer may use an elevated platform such as a "cherry picker" to access high tension wires. The fiberglass hot stick provides electrical insulation enabling utility workers to install the clamp safely on an energized line, without interrupting service. By contrast, contact temperature measurement systems are time consuming and expensive to install, and generally require that electric service be interrupted during installation.

While the method for measuring electrical conductor temperature has been described in connection with various illustrative embodiments, it is to be understood that other similar embodiments may be used or modifications and additions may be made to the described embodiments for performing the same function disclosed herein without deviating therefrom.

The embodiments described above are not necessarily in the alternative, as various embodiments may be combined to provide the desired characteristics. Therefore, the method for measuring electrical conductor temperature should not be limited to any single embodiment, but rather construed in breadth and scope in accordance with the recitation of the appended claims.

The invention claimed is:

1. A method for measuring the temperature of an electrical conductor, the method comprising:
   providing a clamp comprising a flexible, thermally conductive material in thermal contact with the electrical conductor, wherein the clamp has an outer surface of a known emissivity value, or a coating of a known emissivity value is disposed on the outer surface of the clamp; and
   measuring the infrared (IR) temperature of the clamp to determine the temperature of the electrical conductor.

2. The method of claim 1, wherein the electrical conductor comprises a high voltage transmission and/or distribution line.

3. The method of claim 1, wherein the clamp further comprises a generally cylindrically shaped, hollow body.

4. The method of claim 3, wherein the cross-section of the clamp approximates a hollow circle.

5. The method of claim 3, wherein the cross-section of the clamp approximates a hollow oval.

6. The method of claim 1, wherein the flexible, thermally conductive material is at least one of silver, aluminum, copper, gold, platinum, tantalum, molybdenum, zinc, tin, nickel and/or mixtures or alloys thereof.

7. The method of claim 1, wherein the flexible, thermally conductive material is between 0.1 mm and 5 mm thick.

8. The method of claim 1, wherein the coating comprises a high emissivity coating.

9. The method of claim 1, wherein the coating is applied to the outer surface of the clamp by spraying, powder coating, painting and/or anodizing.

10. The method of claim 1, wherein the coating has hydrophobic properties.

11. The method of claim 1, wherein the clamp substantially completely surrounds the electrical conductor.

12. The method of claim 1, wherein an adhesive coating is disposed on the inner surface of the clamp.

13. The method of claim 12, wherein the adhesive coating comprises a thermally conductive material.

14. The method of claim 1, wherein the clamp is engaged by a clamp head capable of conforming the clamp around the electrical conductor in thermal contact therewith.

15. The method of claim 1, wherein the clamp is capable of remaining in place under varying environmental and/or mechanical conditions.

16. A method for measuring the temperature of an electrical conductor, the method comprising:
   mechanically coupling a clamp to the electrical conductor, said clamp comprising a flexible, thermally conductive material, wherein the clamp has an outer surface of a known emissivity value, or a coating of a known emissivity value is disposed on the outer surface of the clamp;
   wherein the temperature of the electrical conductor is determined by measuring the IR temperature of the clamp outer surface or coating.

17. The method of claim 16, wherein said mechanically coupling the clamp to the electrical conductor comprises:
   attaching the clamp to the outer surface of the electrical conductor in thermal contact therewith.

18. The method of claim 17, wherein said attaching the clamp on the electrical conductor comprises installing the clamp using a hot stick.

* * * * *